(12) United States Patent
Czapla et al.

(10) Patent No.: US 12,397,920 B2
(45) Date of Patent: Aug. 26, 2025

(54) DEVICE FOR COUPLING A PROPULSION SYSTEM TO AN ENGINE PYLON OF AN AIRCRAFT, AND CORRESPONDING AIRCRAFT

(71) Applicant: Airbus Operations SAS, Toulouse (FR)

(72) Inventors: Lionel Czapla, Toulouse (FR); Kotaro Fukasaku, Toulouse (FR); Rémi Amargier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/742,442

(22) Filed: Jun. 13, 2024

(65) Prior Publication Data

US 2024/0417090 A1 Dec. 19, 2024

(30) Foreign Application Priority Data

Jun. 16, 2023 (FR) ...................................... 2306195

(51) Int. Cl.
*B64D 27/40* (2024.01)
(52) U.S. Cl.
CPC .................................. *B64D 27/402* (2024.01)
(58) Field of Classification Search
CPC .... B64D 27/40; B64D 27/402; B64D 27/404; B64D 27/406; F02C 7/20
See application file for complete search history.

(56) References Cited

U.S. PATENT DOCUMENTS

| | | | |
|---|---|---|---|
| 4,717,094 A | 1/1988 | Chee | |
| 4,943,013 A | 7/1990 | Kapala et al. | |
| 5,927,644 A | 7/1999 | Ellis et al. | |
| 6,581,874 B2 * | 6/2003 | Lemire | B64D 41/00 60/797 |
| 2009/0108127 A1 * | 4/2009 | Cazals | B64D 27/40 244/54 |
| 2011/0266389 A1 | 11/2011 | Combes et al. | |
| 2014/0084129 A1 * | 3/2014 | Sandy | B64D 27/40 248/554 |
| 2022/0355946 A1 * | 11/2022 | Berjot | B64D 27/404 |

OTHER PUBLICATIONS

French Search Report for corresponding French Patent Application No. 2306195 dated Dec. 5, 2023.

* cited by examiner

*Primary Examiner* — Joshua J Michener
*Assistant Examiner* — Colin Zohoor
(74) *Attorney, Agent, or Firm* — Greer, Burns & Crain, Ltd.

(57) ABSTRACT

A device for coupling a propulsion system to an engine pylon of an aircraft, the device comprising a baseplate comprising first and second parts of the baseplate placed against each other so as to form a base suitable for being fastened to the propulsion system, and a first wall extending substantially perpendicularly to the base. The first wall of the baseplate interacts with a sleeve, a pair of flanges and fasteners to the engine pylon.

6 Claims, 4 Drawing Sheets

DEVICE FOR COUPLING A PROPULSION SYSTEM TO AN ENGINE PYLON OF AN AIRCRAFT, AND CORRESPONDING AIRCRAFT

CROSS-REFERENCES TO RELATED APPLICATIONS

This application claims the benefit of French Patent Application Number 2306195 filed on Jun. 16, 2023, the entire disclosure of which is incorporated herein by way of reference.

FIELD OF THE INVENTION

The present invention relates to a device for coupling a propulsion system to the wing of an aircraft. More specifically, the invention relates to a device for coupling a propulsion system to the engine pylon of the aircraft, and to an aircraft comprising a propulsion system and at least one such device for coupling the propulsion system to the engine pylon.

BACKGROUND OF THE INVENTION

Usually, for an aircraft, a propulsion unit comprises for example a turbojet engine that is fastened to a wing of the aircraft using an engine pylon. The engine pylon generally consists of a structure comprising a plurality of tubes fastened to ribs.

The turbojet engine is fastened to the ribs of the engine pylon by means of engine mounts that conventionally comprise a plurality of front engine mounts at the front, and a plurality of rear engine mounts at the rear. Generally, the turbojet engine is fastened by its gearbox at the front, and by the body of the turbojet engine at the rear.

FIG. 2 illustrates an example of a prior art mount 9 for coupling a turbojet engine T to the engine pylon M of an aircraft. The mount 9 comprises a baseplate 90 in the shape of an inverted T, comprising a base 900 from which a wall 902 extends substantially (i.e., +/−10%) perpendicularly. The base 900 has a generally quadrilateral shape and is suitable for being in contact with the turbojet engine T and fastened to the turbojet engine T, for example using threaded elements (on the gearbox for the front mount and on the body of the turbojet engine for the rear mount, for example).

The wall 902 comprises a bore in which a sleeve (not shown) is housed, which itself has a bore through which is threaded a fastening pin 91 that is fastened to the engine pylon M, for example by screwing. The mount 9 further comprises shock absorbing pads 92 implemented on either side of the wall 902 of the baseplate 90 and held by a set of flanges 93 in order to partially absorb the forces generated by the turbojet engine. A mount 9 implementing pads 92 is also referred to as a flexible mount. A spacer 94 can also be implemented, around part of the sleeve, between the mount 9 and the engine pylon M.

Although the current installations are satisfactory in terms of fastening the turbojet engine to the engine pylon, the implementation of these installations requires a plurality of these installations in order to guard against the potential failure of the mount, particularly in the event that the base 900 breaks or cracks. Having a plurality of these installations leads to excess weight and therefore increased fuel consumption, which is unsatisfactory.

There is therefore a need to provide a solution ensuring optimum and more secure fastening of a turbojet engine to the wing of an aircraft.

SUMMARY OF THE INVENTION

An object of the present invention is to propose a device for coupling a propulsion system to the engine pylon of an aircraft, this device providing a more secure solution for fastening a propulsion system in the event of the failure of the mount.

To this end, a device is proposed for coupling a propulsion system to an engine pylon of an aircraft, said device comprising:
a baseplate substantially in the shape of an inverted T, said baseplate comprising a base suitable for being fastened to said propulsion system and a first wall extending substantially perpendicularly to said base, said first wall comprising a first bore extending along a longitudinal axis;
a substantially tubular sleeve comprising a first portion at least partially received in said first bore of said baseplate and a second portion, a first end of which extends in the continuation of said first portion towards said engine pylon, a second end of said second portion being suitable for interacting with said engine pylon, said sleeve comprising a central bore coaxial with said longitudinal axis;
fastening means comprising a first nut suitable for being rigidly connected to said engine pylon and a first fastening screw, said first fastening screw comprising a first fastening head from which extends perpendicularly a first threaded shank, said first threaded shank being fitted through said central bore of said sleeve;
a second front flange and a second rear flange, said second flanges being arranged respectively on either side of said first wall of said baseplate, said second flanges each comprising a fourth bore coaxial with said longitudinal axis;
a spacer suitable for being arranged between said second rear flange and said engine pylon, said spacer comprising a fifth bore coaxial with said longitudinal axis so that said spacer is fitted onto said second portion of said sleeve.

Said first portion of said sleeve is fitted through said fourth bores of said second flanges. Said first fastening head bears against said second front flange and said first threaded shank is fitted through said central bore of said sleeve, said first threaded shank being screwed to said first nut rigidly connected to said engine pylon.

According the invention, said baseplate comprises a first part and a second part of the baseplate, each of said first and second parts being L-shaped, wherein said first part comprises a first base wall from which extends perpendicularly a second wall comprising a sixth bore, and said second part comprises a second base wall from which extends perpendicularly a third wall comprising a seventh bore.

Said first and second parts of the baseplate are placed against each other so that said second wall and said third wall together form said first wall of said baseplate, said first and second base walls together form said base of said baseplate, and said sixth and seventh bores together form said first bore.

As a result, if one of the first or second parts of the baseplate fails, the other part of the baseplate ensures that the propulsion system continues to be coupled to the engine pylon. The risk of the complete loss of the device for coupling the propulsion system to the engine pylon is therefore reduced.

Advantageously, the device comprises means for centering said first and second parts of the baseplate relative to each other along said longitudinal axis.

According to one particular aspect, said centering means comprise at least one male cylinder coaxial with the longitudinal axis, protruding from a first contact face of said second wall, or of said third wall respectively, and at least one cylindrical recess coaxial with the longitudinal axis, for receiving said at least one male cylinder, said at least one cylindrical recess being made in a second contact face of said third wall, or of said second wall respectively, said first and second contact faces being arranged facing each other when said first and second parts of the baseplate are assembled.

According to another particular aspect, the fastening means comprise a second nut positioned bearing against a free end of said first threaded shank at the opposite end from said first fastening head, the second fastening means also comprising a second fastening screw comprising a second fastening head from which extends perpendicularly a second threaded shank. Said second fastening head bears against said first fastening head and said second threaded shank is fitted through an eighth bore extending coaxially with said longitudinal axis, passing through said first fastening screw, and said second threaded shank is screwed into said second nut.

According to another particular aspect, the device also comprises:
- a pair of first flanges, said first flanges being fastened respectively on either side of said first wall of said baseplate, said first flanges each comprising a second bore coaxial with said longitudinal axis; and
- a pair of pads, said pads being arranged respectively against one of said first flanges, said pads each comprising a third bore coaxial with said longitudinal axis;
- wherein said pads are each clamped between a second flange and a first flange;
- and wherein each first portion of said sleeve is threaded through said second bores of said first flanges and through said third bores of said pads.

The invention also proposes an aircraft comprising a propulsion system, an engine pylon and at least one device as described above, said propulsion system being coupled to the engine pylon by said at least one device, wherein said baseplate is fastened to said propulsion system and said first nut is fastened to said engine pylon.

BRIEF DESCRIPTION OF THE DRAWINGS

The aforementioned features of the invention, along with others, will become more apparent on reading the following description of an embodiment and its variants, said description being given with reference to the appended drawings, in which.

DETAILED DESCRIPTION OF THE PREFERRED EMBODIMENTS

Figure 1:
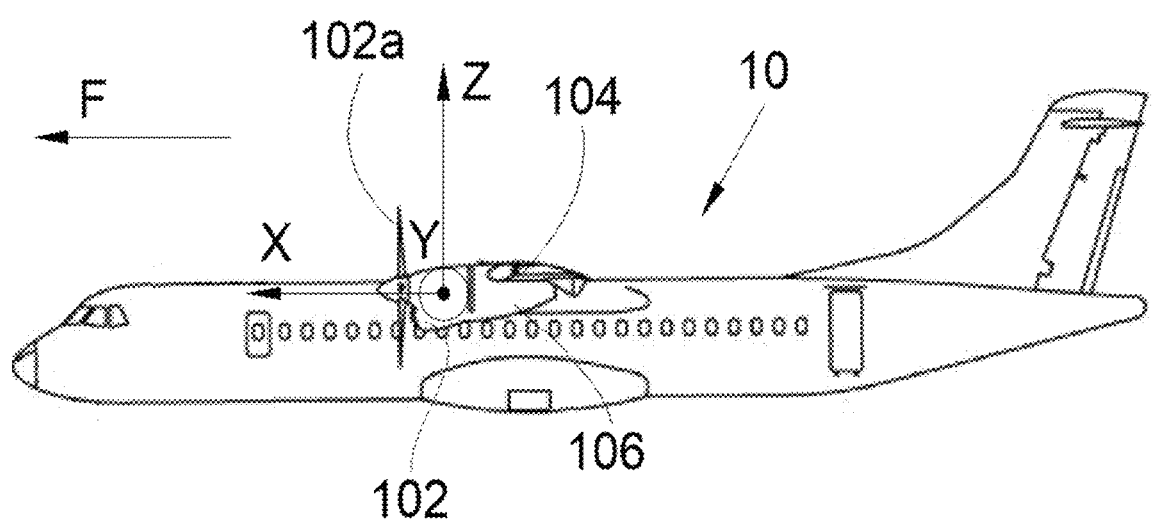
FIG. 1 is a side view of an aircraft according to the invention.
Figure 2:
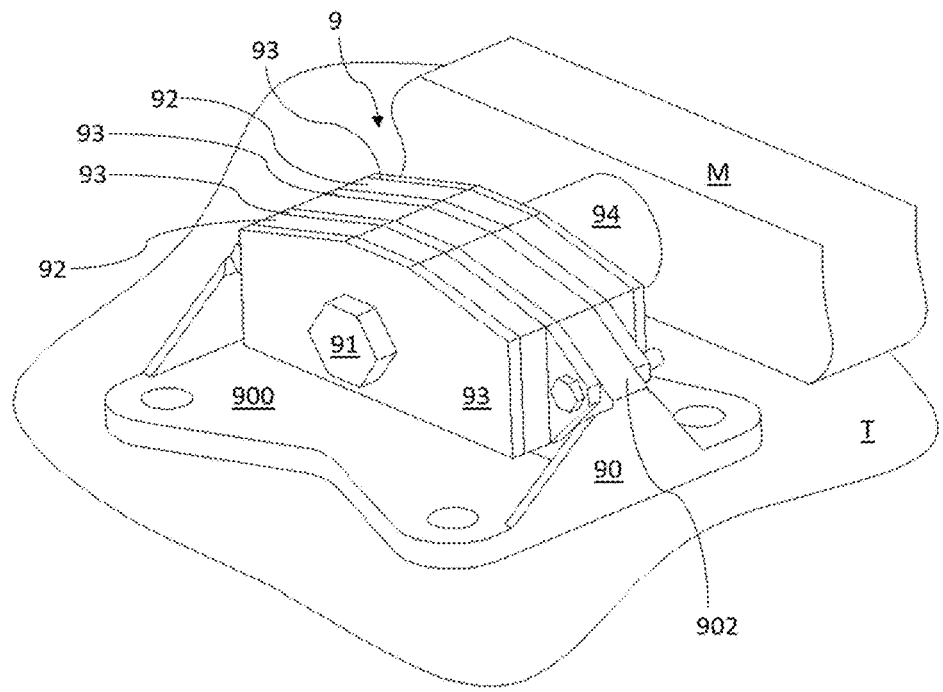
FIG. 2 is a perspective view of a mount according to a prior art solution.

FIG. 1 shows an aircraft 10 that comprises a propulsion system 102, for example a turbojet engine or turboprop engine. The propulsion system 102 is connected to a wing 104 of the aircraft 10 by means of an engine pylon 106.

In the following description, terms relating to a position are given with reference to an aircraft in the normal flight position, that is, as shown in FIG. 1, and the positions "front" and "rear" are given relative to the front and rear of the propulsion system 102 and relative to the direction of travel F of the aircraft 10 when the propulsion system 102 is operating.

In the following description, and by convention, the X direction is the longitudinal direction of the propulsion system, which is horizontal when the aircraft is on the ground, the Y direction is the transverse direction, which is horizontal when the aircraft is on the ground, and the Z direction is the vertical direction, which is vertical when the aircraft is on the ground, these three directions X, Y and Z being mutually orthogonal.

The engine pylon 106 and the propulsion system 102 have a vertical mid-plane XZ and the propulsion system 102 is in this case a turboprop engine with a propeller 102a, but it could be a turbofan engine with a nacelle.

Figure 3:
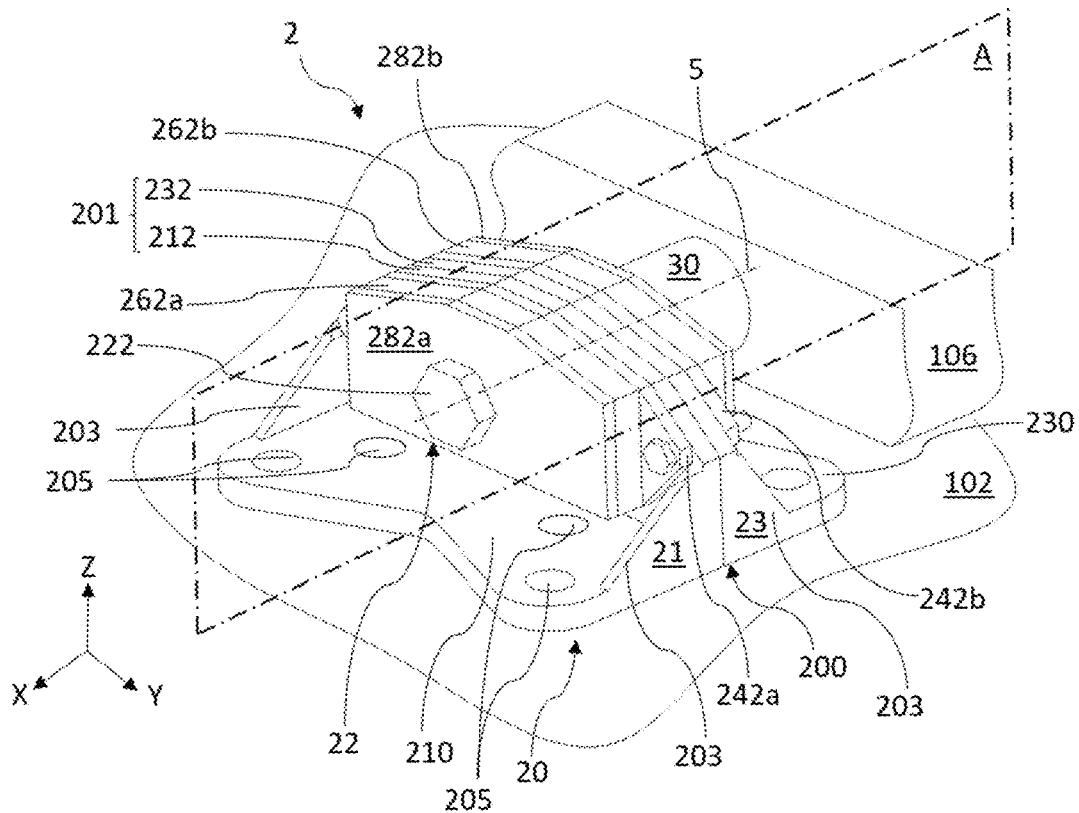
FIG. 3 is a perspective view of a coupling device according to one exemplary embodiment of the invention.
Figure 4:
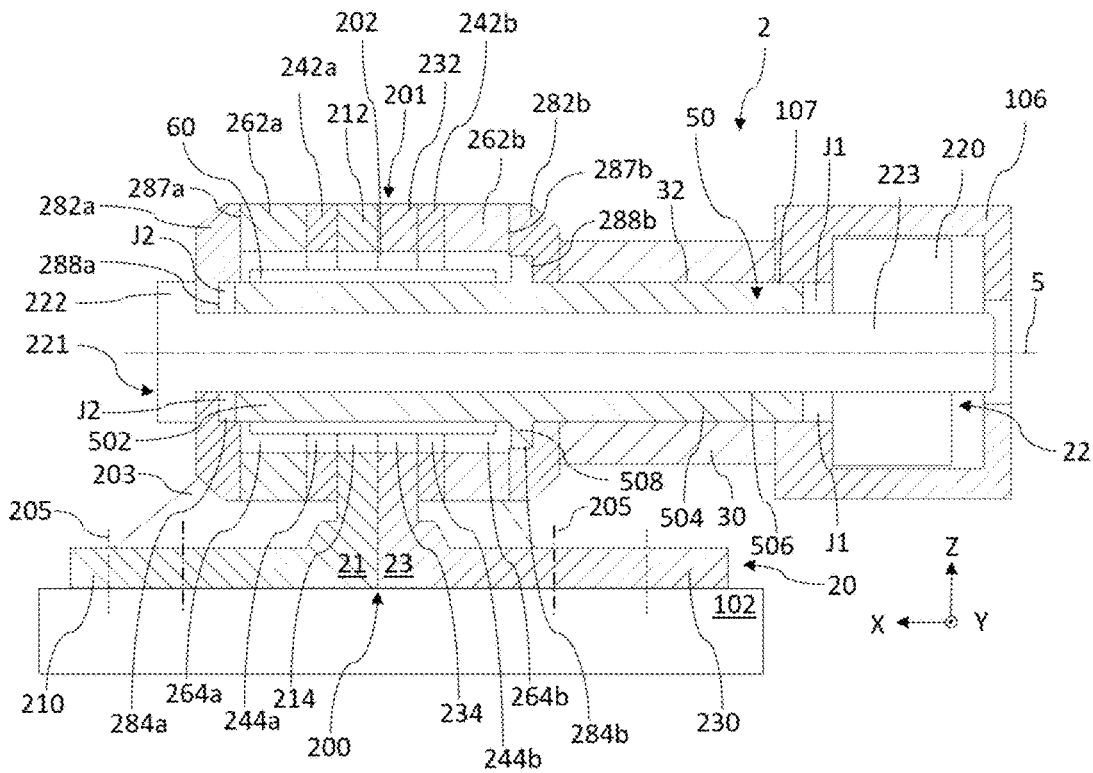
FIG. 4 is a cross-sectional side view along the plane A of the device in FIG. 3.

FIGS. 3 and 4 show a device 2 for coupling a propulsion system 102 to the engine pylon 106 of the aircraft 10 according to a main embodiment of the invention. Here, the device 2 is illustrated horizontally so that the elements can be described in relation to the orthonormal coordinate system X, Y, Z described above. It will clearly be understood that the device 2 can be arranged and oriented differently in order to adapt to the propulsion system 102 and engine pylon 106 to which the device is fastened. FIG. 4 illustrates a cross-sectional side view along the section plane A. The section plane A is a plane parallel to the vertical plane XZ passing through the axis of the first fastening screw described in greater detail hereinafter. The section plane A is the same for FIGS. 5 to 7.

In this example, the device 2 comprises a baseplate 20 substantially in the shape of an inverted T. This baseplate 20 comprises a substantially flat base 200, which in this illustration extends in a plane parallel to the plane XY. The base 200 is suitable for being fastened to the propulsion system 102 by fastening means such as threaded elements. To this end, the base 200 has, in this example, holes 205 made at least in each corner of the base 200. The holes 205 are each suitable for receiving a fastening screw to allow a screw fastening. Other techniques for fastening the baseplate to the propulsion system can be envisaged, such as riveting or welding in particular.

The baseplate 20 comprises a first wall 201 that extends perpendicularly to the base 200, that is, in a plane parallel to the plane YZ. The first wall 201 further comprises a first bore 202 situated substantially in the center of the first wall 201 and that extends along a longitudinal axis 5, which is shown here substantially parallel to the horizontal axis X.

The baseplate 20 can also comprise lateral reinforcing walls 203 extending between the base 200 and the first wall 201, on the lateral edges of the baseplate 20, so as to absorb the mechanical forces. In this example, the lateral walls 203 are triangular.

The device 2 also comprises a generally tubular sleeve 50 extending coaxially with the longitudinal axis 5. The sleeve 50 comprises a first portion 502 at least part of which is received in the first bore 202 of the baseplate 20, and a second portion 504 a first end of which extends from and in the continuation of the first portion 502 towards the engine pylon 106.

As illustrated in FIG. 4, the free end of the second portion 504 is suitable for interacting with the engine pylon 106. More specifically, the free end of the second portion 504 is fitted into a recess 107 made in the engine pylon 106.

In this example, the first and second portions 502, 504 are separated by a shoulder 508 making it possible to optimize the positioning of the sleeve 50, as described in greater detail hereinafter.

The sleeve 50 further comprises a central bore 506 extending coaxially with the first bore 202 of the baseplate 20. This central bore 506 is suitable for receiving a first fastening screw 221, described below.

The device 2 comprises fastening means 22 that make it possible to fasten the device 2 to the engine pylon 106. To this end, the fastening means 22 comprise a first nut 220 rigidly connected to the engine pylon 106 and a first fastening screw 221. In this example, the first nut 220 rigidly connected to the engine pylon 106 is captive, but any other type of nut that can be rigidly connected to the engine pylon can be implemented. An axial assembly clearance J1 (visible in FIG. 4) can be provided between the free end of the second portion 504 of the sleeve 50 and the first nut 220 so as to allow the deformation of the pads described hereinafter on the tightening of the first fastening screw 221. The axial clearance J1 also allows the compression of the spacer 30 between the engine pylon 106 and a second rear flange 282b described hereinafter.

The first fastening screw 221 comprises a first fastening head 222 arranged at the opposite end from the engine pylon 106 and that bears against a second front flange 282a (described below). A first threaded shank 223 extends perpendicularly from the first fastening head 222, along the longitudinal axis 5, and is fitted through the central bore 506 of the sleeve 50. The first threaded shank 223 has a length greater than the length of the sleeve 50 so that it can be screwed into the nut 220 rigidly connected to the engine pylon 106. The sleeve 50, via the fastening means 22, makes it possible to transfer the shear forces generated by the propulsion system 102 to the engine pylon 106.

The device 2 further comprises a pair of first flanges comprising a first front flange 242a and a first rear flange 242b. The first front and rear flanges 242a, 242b are respectively fastened on either side of the first wall 201 of the baseplate 20. In this example, the first front and rear flanges 242a, 242b are fastened to the first wall 201 using fastening screws situated in the vicinity of the lateral edges of the first wall 201. However, it will be understood that other fastening means can be envisaged without departing from the scope of the invention.

The first front and rear flanges 242a, 242b each comprise a second bore, 244a, 244b respectively, extending coaxially with the longitudinal axis 5. The dimensions of the second bores 244a, 244b are configured so that they can receive the first portion 502 of the sleeve 50. In this example, a radial assembly clearance is provided between the second bores 244a, 244b and the first portion 502 of the sleeve 50 in order to allow the deformation of the pads (described below) up to a predetermined load level.

The device 2 comprises at least one pair of pads that allow the predetermined deformation of the device 2 in order to at least partially absorb the forces generated by the propulsion system 102. Implementing these pads makes it possible to obtain a "flexible mount".

In this example, the device 2 comprises two pads, namely a front pad 262a and a rear pad 262b. The front and rear pads 262a, 262b are arranged respectively bearing against the first front flange 242a and the first rear flange 242b.

The front and rear pads 262a, 262b each comprise a third bore, 264a, 264b respectively, extending coaxially with the longitudinal axis 5. The dimensions of the third bores 264a, 264b are configured so that they can receive the first portion 502 of the sleeve 50. In this example, a radial assembly clearance is provided between the third bores 264a, 264b and the first portion 502 of the sleeve 50 in order to allow the deformation of the pads 262a, 262b up to a predetermined load level. In this example, the pads 262a, 262b are made from an elastomer the elasticity of which can be selected as a function of the maximum deformation desired, for example.

The device 2 further comprises a pair of second flanges comprising a second front flange 282a and a second rear flange 282b. The second front and rear flanges 282a, 282b are respectively arranged on either side of the first wall 201 of the baseplate 20. More specifically, the second front and rear flanges 282a, 282b respectively bear against the front and rear pads 262a, 262b so that the front pad 262a is clamped between the first front flange 242a and the second front flange 282a, and the rear pad 262b is clamped between the first rear flange 242b and the second rear flange 282b.

The second front and rear flanges 282a, 282b each comprise a fourth bore, 284a, 284b respectively, extending coaxially with the longitudinal axis 5. In this example, no radial assembly clearance is provided between the fourth bores 284a, 284b and the first portion 502 of the sleeve 50 in order to allow conjoint radial movement between the sleeves 50 and the second front and rear flanges 282a, 282b. In particular, the first and second parts 21, 22 of the baseplate move relative to the sleeve 50 and relative to the second front and rear flanges 282a, 282b due to the deformation of the pads 262a, 262b.

The sleeve 50 drives the second front and rear flanges 282a, 282b, which in turn cause the deformation of the pads 262a, 262b.

The second front and rear flanges 282a, 282b each comprise, on their faces 287a, 287b that are facing each other when the device 2 is assembled, that is their faces in contact with the pad, first and second cavities 288a, 288b. More specifically, the first cavity 288a made on the face 287a of the second front flange 282a makes it possible to receive the free end of the first portion 502 of the sleeve 50. In this example, an axial assembly clearance J2 (visible in FIG. 4) is provided between the cavity 288a and the first portion 502 of the sleeve 50, in order to allow the deformation of the pads 262a, 262b on the tightening of the first fastening screw 221. The second cavity 288b made on the face 287b of the second front flange 282b makes it possible to receive the shoulder 508 separating the first and second portions 502, 504 of the sleeve 50.

The device 2 also comprises a spacer 30 suitable for being arranged between the second rear flange 282b and the engine pylon 106, and for bearing against the second rear flange 282b and the engine pylon 106 when the device 2 is assembled. When the first fastening screw 221 is tightened, the spacer 30 is therefore compressed between the second rear flange 282b and the engine pylon 106.

The spacer 30 comprises a fifth bore 32 extending coaxially with the longitudinal axis 5. The dimensions of the fifth bore 32 are configured so that they can receive the second portion 504 of the sleeve 50. More specifically, the spacer 30 is fitted onto the second portion 504 of the sleeve 50 and therefore extends around the second portion 504 of said sleeve 50.

The first portion 502 of the sleeve 50 is therefore fitted through the second bores 244a, 244b of the first flanges 242a, 242b, through the third bores 264a, 264b of the pads 262a, 262b and through the fourth bores 284a, 284b of the second flanges 282a, 282b, while the spacer 30 is fitted onto the second portion 504 of the sleeve 50. In addition, the first fastening head 222 bears against the second front flange 282a and the first threaded shank 223 is fitted through the central bore 506 of the sleeve 50 in order to be screwed to the first nut 220 rigidly connected to the engine pylon 106. Implementing the spacer 30 and the second flanges 282a, 282b therefore makes it possible, on the tightening of the first fastening screw 221, to clamp the elements of the device 2 together.

Optionally, the device 2 can implement a protective cylinder 60 that is fitted onto at least part of the first portion 502 of the sleeve 50. The cylinder 60 makes it possible to protect the sleeve 50 from any contact and friction between it and the baseplate 20 on the deformation of the pads 262a, 262b.

According to the invention, and in order to provide a solution in the event the failure of the baseplate 20 (such as a crack in the base 200, for example), the baseplate 20 is divided so that it comprises a first part 21 and a second part 23 of the baseplate 20. As a result, if one of the first or second parts 21, 22 of the baseplate 20 fails, the other part of the baseplate ensures that the propulsion system 102 continues to be coupled to the engine pylon 106. The risk of the complete loss of the device 2 for coupling the propulsion system 102 to the engine pylon 106 is therefore reduced. In addition, this solution makes it possible to provide multiple paths (via the first and second parts of the baseplate) for transferring the forces generated by the propulsion system 1002 to the engine pylon 106.

More specifically, each of the first and second parts 21, 23 is in the shape of an L the vertical portions of which are placed against each other on assembly of the device 2. The first part 21 comprises a first base wall 210 extending in a plane parallel to the horizontal plane XY from which extends perpendicularly a second wall 212, which therefore extends in a plane parallel to the vertical plane YZ. The second wall 212 comprises a sixth bore 214 extending coaxially with the longitudinal axis 5.

The second part 23 of the baseplate 20 comprises a second base wall 230 extending in a plane parallel to the horizontal plane XY and from which extends perpendicularly a third wall 232, which therefore extends in a plane parallel to the vertical plane YZ. The third wall 232 comprises a seventh bore 234 extending coaxially with the longitudinal axis 5. In this example, each of the first and second parts 21, 23 of the baseplate 20 comprises lateral reinforcing walls 203.

The first and second parts 21, 23 of the baseplate 20 are arranged bearing against each other so that the second wall 212 and the third wall 232 are placed against each other and together form the first wall 201 of the baseplate 20, the first base wall 210 and the second base wall 230 together form the base 200 of the baseplate 20, and the sixth and seventh bores 214, 234 together form the first bore 202 of the baseplate 20.

In the example illustrated in FIGS. 3 and 4, each of the first and second base walls 210, 230 comprises four holes 205 made substantially in each corner of the first and second base walls 210, 230. The holes 205 are each suitable for receiving a fastening screw that makes it possible to fasten the first and second parts 21, 23 of the baseplate 20 to the propulsion system 102.

Figure 5:
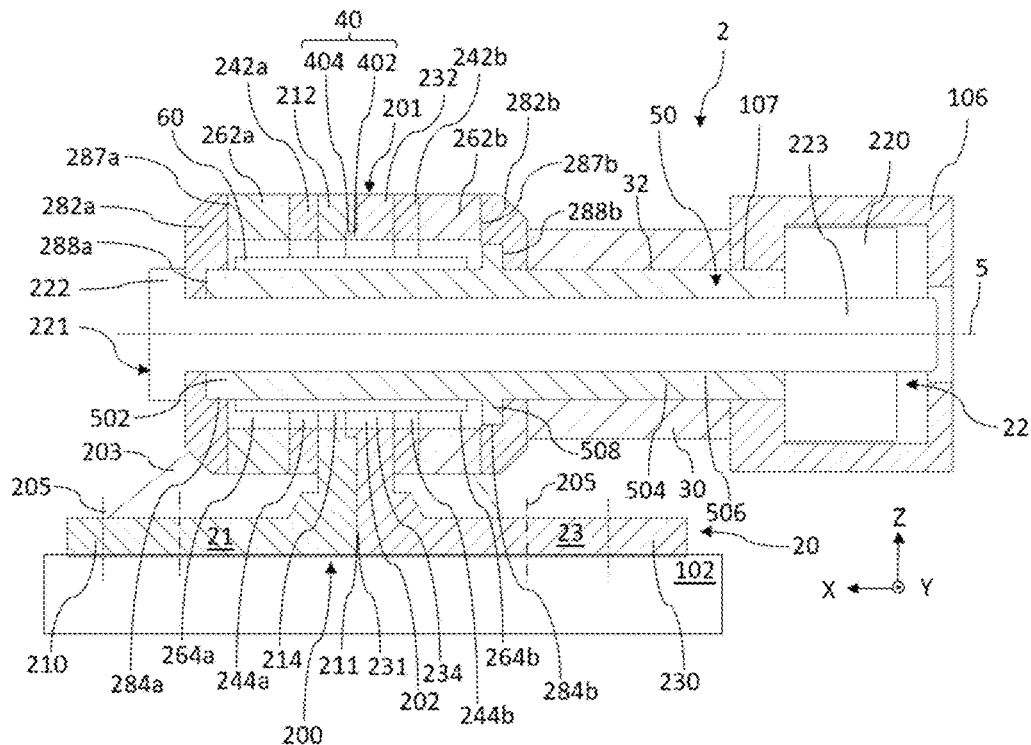
FIG. 5 is a cross-sectional side view along the plane A of a first variant of the device in FIG. 3.

In a first variant of the main exemplary embodiment, and as illustrated in FIG. 5, the device 2 further comprises means 40 for centering the first and second parts 21, 23 of the baseplate 20 relative to each other relative to the direction X, and more specifically relative to the longitudinal axis 5 of the first fastening screw 221. These centering means 40 make it possible to facilitate the positioning of the first and second parts 21, 23 of the baseplate 20 relative to each other and the assembly of the different elements of the device 2. The centering means 40 also make it possible to improve the holding of the first and second parts 21, 23 of the baseplate 20 relative to each other, for example on the failure of one of the first and second parts 21, 23 of the baseplate 20.

In this example, the centering means 40 comprise at least one male cylinder 402, coaxial with the longitudinal axis 5, borne by and protruding from a first contact face 211, 231 of the part 21 or the part 22 of the baseplate 20. The at least one male cylinder 402 interacts with a corresponding female cylindrical recess 404 for receiving the male cylinder 402. The cylindrical recess 404 extends coaxially with the longitudinal axis 5 and is made in a second contact face 211, 231 of the other of the parts 21, 23. The first and second contact faces are arranged facing each other when the first and second parts 21, 23 of the baseplate 20 are assembled.

More particularly, in the example illustrated in FIG. 5, the first wall 201 of the first part 21 of the baseplate 20 comprises a cylindrical recess 404 on its second contact face 211, oriented towards the second part 23 of the baseplate 20. The second wall 230 of the second part 23 of the baseplate 20 comprises a male cylinder 402 protruding from the first contact face 231 oriented towards the first part 21 of the baseplate 20. The male cylinder 402 and the cylindrical recess 404 have corresponding dimensions and positions so that the male cylinder 402 of the second part 23 of the baseplate 20 is received in the cylindrical recess 404 of the first part 21 of the baseplate 20.

It will be clearly understood that the male cylinder could be borne by the first part of the baseplate and the cylindrical recess could be made in the second part of the baseplate without departing from the scope of the invention.

Figure 6:
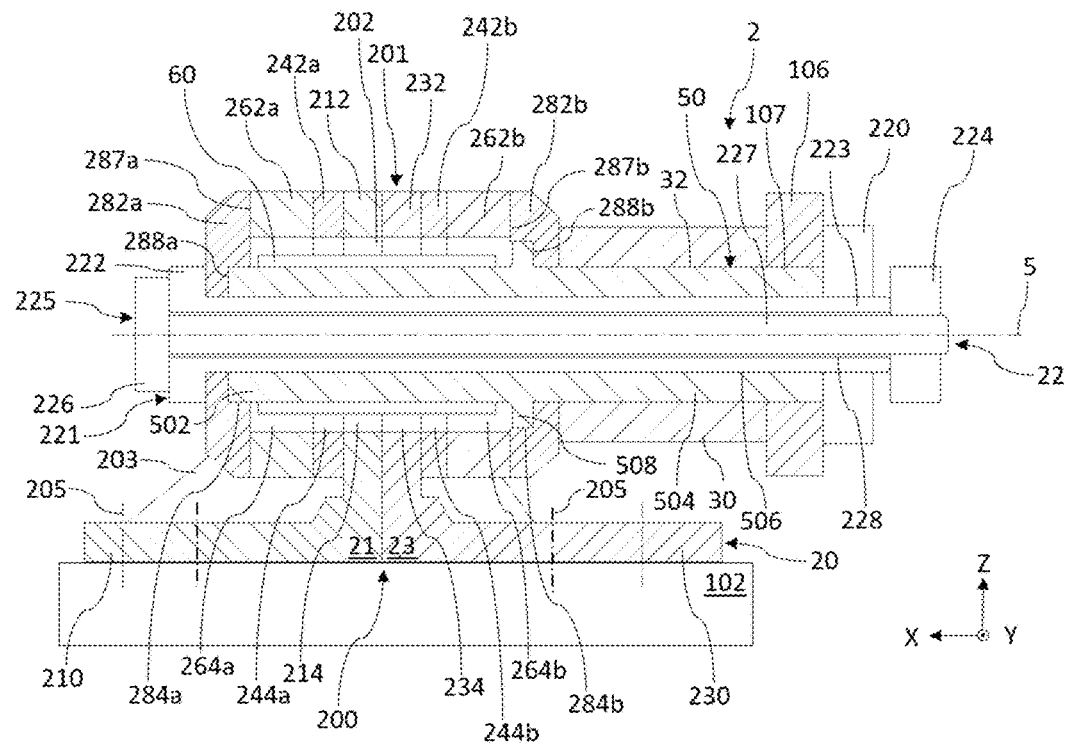
FIG. 6 is a cross-sectional side view along the plane A of a second variant of the device in FIG. 3.

In a second variant of the main exemplary embodiment, and as illustrated in FIG. 6, the device 2 comprises a solution in the event of the failure of the first fastening screw 221. In this second variant, the fastening means 22 of the device 2 comprise a second nut 224, referred to as a lock nut, and a second fastening screw 225. The second nut 224 is arranged within the engine pylon 106 and bears against the free end of the first threaded shank 223 of the first fastening screw 221, that is at the opposite end from the first fastening head 222 of the first fastening screw 221. More specifically, the second nut 224 is housed in the engine pylon 106 and is a through nut. The second fastening screw 225 comprises a second fastening head 226 bearing against the first fastening head 221 from which extends perpendicularly a second threaded shank 227, along the longitudinal axis 5. The second threaded shank 227 is fitted through an eighth bore 228 passing through the first fastening screw 221 and extending along the longitudinal axis 5. The length of the second threaded shank 227 is selected so that the second threaded shank 227 extends beyond the free end of the first threaded shank 223 and the second threaded shank 227 can be screwed into the second nut 224.

As a result, in the event of the failure of the first fastening screw 221 (the breaking of the threaded shank, for example), the second fastening screw 225 takes over so as to ensure that the propulsion system 102 continues to be coupled to the engine pylon 106. In other words, the second fastening screw 225 is a "backup", in that it is not directly engaged with the elements of the device 2, unlike the first fastening screw 221. The second fastening screw 225 is only engaged in the event of the failure of the first fastening screw 221.

Figure 7:
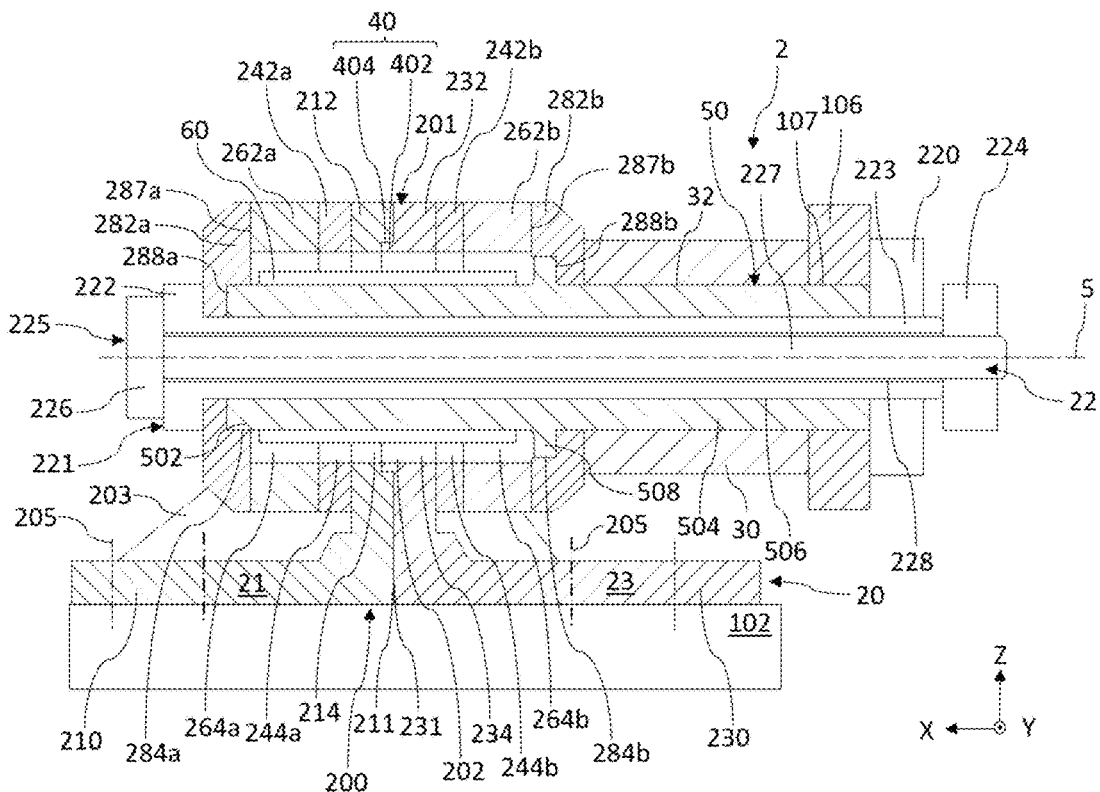
FIG. 7 is a cross-sectional side view along the plane A of a third variant of the device in FIG. 3.

In a third variant illustrated in FIG. 7, the device 2 comprises both the centering means 40 described with reference to FIG. 5 and the second fastening screw 225 described with reference to FIG. 6. As the implementation of the centering means 40 and the second fastening screw is identical, it is not described again. Such a device 2 therefore proposes a solution in the event of the failure of the baseplate 20 and/or the first fastening screw 221.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for coupling a propulsion system to an engine pylon of an aircraft, said device comprising:
   a baseplate in a shape of an inverted T, said baseplate comprising a base configured to be fastened to said propulsion system and a first wall extending substantially perpendicularly to said base, said first wall comprising a first bore extending along a longitudinal axis;
   a tubular sleeve comprising a first portion at least partially received in said first bore of said baseplate, and a second portion a first end of which extends in a continuation of said first portion towards said engine pylon, a second end of said second portion being configured to interact with said engine pylon, said sleeve comprising a central bore coaxial with said longitudinal axis;
   fastening means comprising a first nut configured to be rigidly connected to said engine pylon and a first fastening screw, said first fastening screw comprising a first fastening head from which extends perpendicularly a first threaded shank, said first threaded shank being fitted through said central bore of said sleeve;
   a second front flange and a second rear flange, said second front and rear flanges being arranged respectively on either side of said first wall of said baseplate, said second flanges each comprising a fourth bore coaxial with said longitudinal axis;
   a spacer configured to be arranged between said second rear flange and said engine pylon, said spacer comprising a fifth bore coaxial with said longitudinal axis so that said spacer is fitted onto said second portion of said sleeve;
   wherein said first portion of said sleeve is fitted through said fourth bores of said second flanges;
   wherein said first fastening head bears against said second front flange, and said first threaded shank is fitted through said central bore of said sleeve, said first threaded shank being screwed to said first nut rigidly connected to said engine pylon;
   wherein said baseplate comprises a first part and a second part of the baseplate, each of said first and second parts being L-shaped, wherein said first part comprises a first base wall from which extends perpendicularly a second wall comprising a sixth bore, and said second part comprises a second base wall from which extends perpendicularly a third wall comprising a seventh bore, said first and second parts of the baseplate being placed against each other so that said second wall and said third wall together form said first wall of said baseplate, said first and second base walls together form said base of said baseplate, and said sixth and seventh bores together form said first bore.

2. The device according to claim 1, further comprising:
   means for centering said first and second parts of the baseplate relative to each other along said longitudinal axis.

3. The device according to claim 2, wherein said means for centering comprise at least one male cylinder coaxial with the longitudinal axis, protruding from a first contact face of said second wall, or of said third wall respectively, and at least one cylindrical recess coaxial with the longitudinal axis, for receiving said at least one male cylinder, said at least one cylindrical recess being made in a second contact face of said third wall, or of said second wall respectively, said first and second contact faces being arranged facing each other when said first and second parts of the baseplate are assembled.

4. The device according to claim 1, wherein said fastening means comprise a second fastening means having a second nut positioned bearing against a free end of said first threaded shank at an opposite end from said first fastening head, the second fastening means also comprising a second fastening screw comprising a second fastening head from which extends perpendicularly a second threaded shank,
   wherein said second fastening head bears against said first fastening head, and said second threaded shank is fitted through an eighth bore extending coaxially with said longitudinal axis, passing through said first fastening screw, and said second threaded shank is screwed into said second nut.

5. The device according to claim 1, further comprising:
   a pair of first flanges, said first flanges being fastened respectively on either side of said first wall of said baseplate, said first flanges each comprising a second bore coaxial with said longitudinal axis; and
   a pair of pads, said pads being arranged respectively against one of said first flanges, said pads each comprising a third bore coaxial with said longitudinal axis;
   wherein said pads are each clamped between a second flange and a first flange; and
   wherein said first portion of said sleeve is fitted through said second bores of said first flanges and through said third bores of said pads.

6. An aircraft comprising:
   a propulsion system,
   an engine pylon, and the device according to claim 1, said propulsion system being coupled to the engine pylon by said device, wherein said baseplate is fastened to said propulsion system, and said first nut is fastened to said engine pylon.

\* \* \* \* \*